United States Patent [19]
Schaffer et al.

[11] Patent Number: 5,259,053
[45] Date of Patent: Nov. 2, 1993

[54] DISCRETE OPTICAL RECEPTACLE ASSEMBLY WITH ALIGNMENT FEATURE

[75] Inventors: Ronald R. Schaffer, Harrisburg, Pa.; Gary N. Warner, Memphis, Tenn.

[73] Assignee: The Whitaker Corporation, Wilmington, Del.

[21] Appl. No.: 906,103

[22] Filed: Jun. 29, 1992

[51] Int. Cl.$^5$ .............................................. G02B 6/26
[52] U.S. Cl. ...................................... 385/88; 385/92; 385/93; 385/52; 385/78
[58] Field of Search ..................... 385/88, 89, 90, 92, 385/93, 94, 52, 53, 76, 77, 78, 79, 33, 14

[56] References Cited

U.S. PATENT DOCUMENTS

| | | | |
|---|---|---|---|
| 4,533,209 | 8/1985 | Segerson et al. | 385/88 X |
| 4,767,179 | 8/1988 | Sampson et al. | 385/90 X |
| 4,778,240 | 10/1988 | Komatsu | 385/92 |
| 4,993,803 | 2/1991 | Suverison et al. | 385/88 X |
| 5,005,939 | 4/1991 | Arvanitakis et al. | 385/90 X |
| 5,071,219 | 12/1991 | Yurtin et al. | 385/89 |
| 5,073,046 | 12/1991 | Edwards et al. | 385/90 |
| 5,078,515 | 1/1992 | Soulard et al. | 385/89 |
| 5,091,991 | 2/1992 | Briggs et al. | 385/52 X |
| 5,104,243 | 4/1992 | Harding | 385/92 |
| 5,117,476 | 5/1992 | Yingst et al. | 385/88 |
| 5,125,056 | 6/1992 | Hughes et al. | 385/59 |
| 5,127,073 | 6/1992 | Mulholland et al. | 385/92 |
| 5,138,679 | 8/1992 | Edwards et al. | 385/90 |
| 5,138,680 | 8/1992 | Briggs et al. | 385/90 |
| 5,140,663 | 8/1992 | Edwards et al. | 385/90 |

*Primary Examiner*—Brian Healy
*Attorney, Agent, or Firm*—Kathrine A. Nelson; Driscoll A. Nina, Jr.

[57] ABSTRACT

A discrete fiber optic receptacle assembly (10) formed of an interlocking main section (30) and end panel section (20) within which one or more active optical devices (50) may be seated and enclosed. The active optical devices (50) are urged into alignment by insertion of the end panel section (20) into the interlocking main section (30), and pegs (22) become anchored in notches (38) to maintain the alignment by a secure resistance fit.

20 Claims, 6 Drawing Sheets

DISCRETE OPTICAL RECEPTACLE ASSEMBLY WITH ALIGNMENT FEATURE

FIELD OF THE INVENTION

The present invention relates to fiber optics and, in particular, to a discrete receptacle assembly comprised of parts which may be assembled to house one or more active optical devices and to align the optical device(s) with a mating optical plug.

BACKGROUND OF THE INVENTION

Accurate optical data communication requires exact alignment of optical fiber(s) between transmitters and receivers. Precision interconnection systems are normally used to establish and maintain the proper alignment. Such interconnection systems typically include precision receptacles, plugs, and associated hardware.

There are significant ongoing efforts to fine-tune the degree of alignment which can be achieved in such interconnection systems. One well-known way of accomplishing this is to minimize the required manufacturing tolerances of the component parts.

Recent efforts have centered on safeguards which insure the integrity of the assembly process. For instance, it is now recognized that transmission accuracy can be increased and signal losses can be reduced by maintaining a precise alignment of the active optical device within an optical receptacle throughout the assembly process. As an example, related co-pending application Ser. No. 07/905,937, pending, discloses an alignment cover for a conventional fiber optical receptacle of the type which includes an outer shell defining a central chamber with an open end for receiving a mating plug or receptacle cover. Conventional receptacles may be simplex receptacles which house a single active device for interconnection and alignment of a single optical fiber, or they may be duplex receptacles which house dual active devices for interconnection and alignment of a duplex optical fiber. In either case, the receptacle is formed with the proper number of cavities in which a conventional active optical device (such as a photo-diode, photo-transistor or the like) may be seated to face the mating plug.

The above-described alignment cover of co-pending application Ser. No. 07/905,937, pending, protects such conventional receptacles when no plug is inserted. The alignment cover serves an additional purpose in that it aligns the active optical device(s) within the receptacle throughout the assembly and soldering process, and it does this at no significant additional manufacturing cost.

There is considerable room for further improvement. For example, the fixed cavity-size in conventional receptacles fails to adequately accommodate for tolerances in the size of the active optical devices. Moreover, it has been found that improvements in performance can be attained by shielding the active optical devices in conductive enclosures (a.k.a. "cans"), yet and the fixed cavity-size in conventional receptacles cannot accommodate this.

Hence, there is an immediate commercial need for a fiber optic receptacle which can accommodate variations in the size of the active optical devices or shielding thereof while maintaining a precise alignment of the active optical device within the receptacle throughout the assembly process.

SUMMARY OF THE INVENTION

It is, therefore, an object of the present invention to provide a discrete fiber optic receptacle assembly formed of interlocking parts to accommodate variations in the size of the active optical devices, and to accept shielding of the devices.

It is another object of the present invention to provide a fiber optic receptacle assembly in which an active optical device is inserted in a shield, and the shield is then urged into alignment between two resistance-fit interlocked sections of a discrete receptacle housing.

It is a specific object of the present invention to provide a resistance-fit two-piece duplex receptacle housing which may be assembled around two active optical devices and two associated shields.

It is still another object of the present invention to provide a receptacle assembly as described above which can be manufactured at minimum expense.

In accordance with the above-described objects, the present invention provides an optical receptacle assembly for seating and aligning a conventional active optical device of a type having a concave alignment face. The receptacle assembly comprises a discrete receptacle housing formed of interlocking parts which include a main housing section. The main housing section is defined by a central chamber, a first open end for receiving an optical plug or, alternatively, a receptacle cover, and a second open end for receiving said active optical device. Preferably, the main housing section also includes an alignment ferrule formed integrally therein to provide an optical communication path to the above-described concave face of the active optical device. The alignment ferrule is provided with a rimmed tip extending toward the second open end of the main housing section.

The receptacle assembly also includes an end panel section which is slidably insertable into the main housing section to cover the second open and thereby enclose the active optical device. The alignment feature is concurrently carried out as the end panel section urges the concave face of the active optical device against the rimmed tip of the ferrule. Hence, the ferrule serves to bias the active optical device into alignment as the end panel section is fully inserted in the main housing section.

The end panel section is anchored in the main housing section with a secure resistance fit, the fit being accomplished with a plurality of pegs protruding from one section and a corresponding plurality of notches in the other section for receiving the pegs.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT(S)

Figure 1:
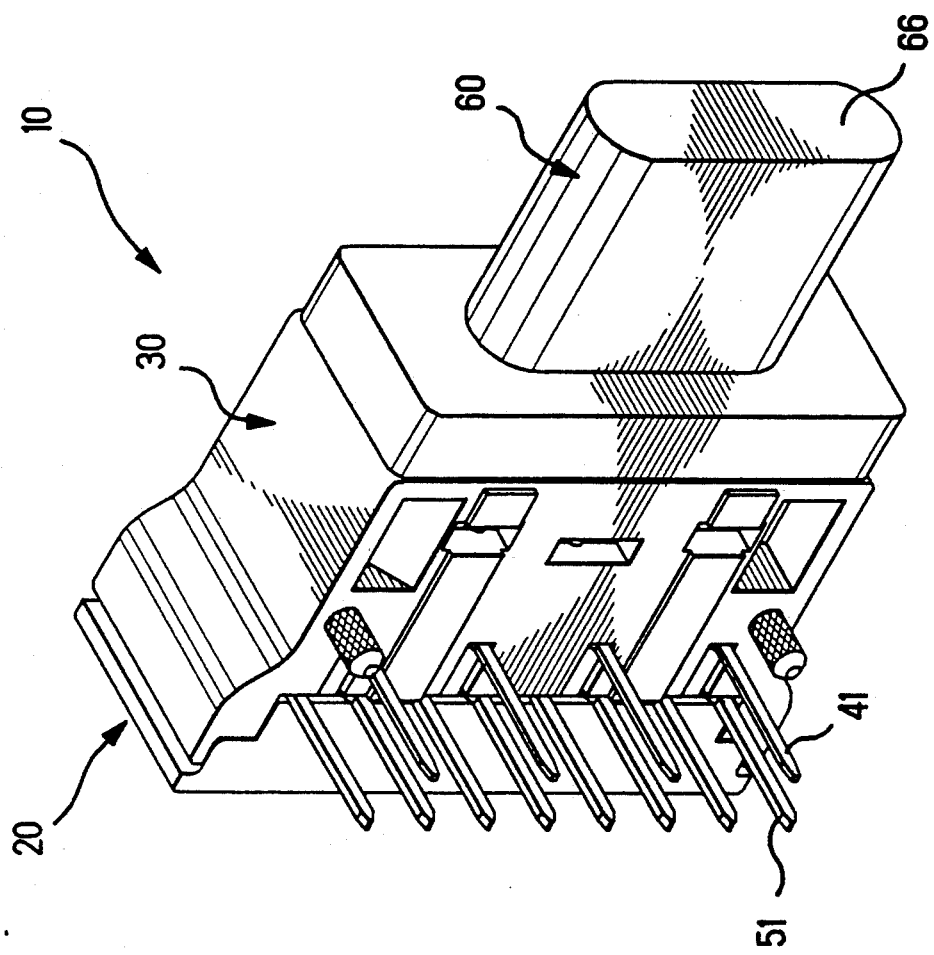
FIG. 1 illustrates a fully assembled duplex embodiment of the fiber optic receptacle assembly 10 according to the present invention.
Figure 2:
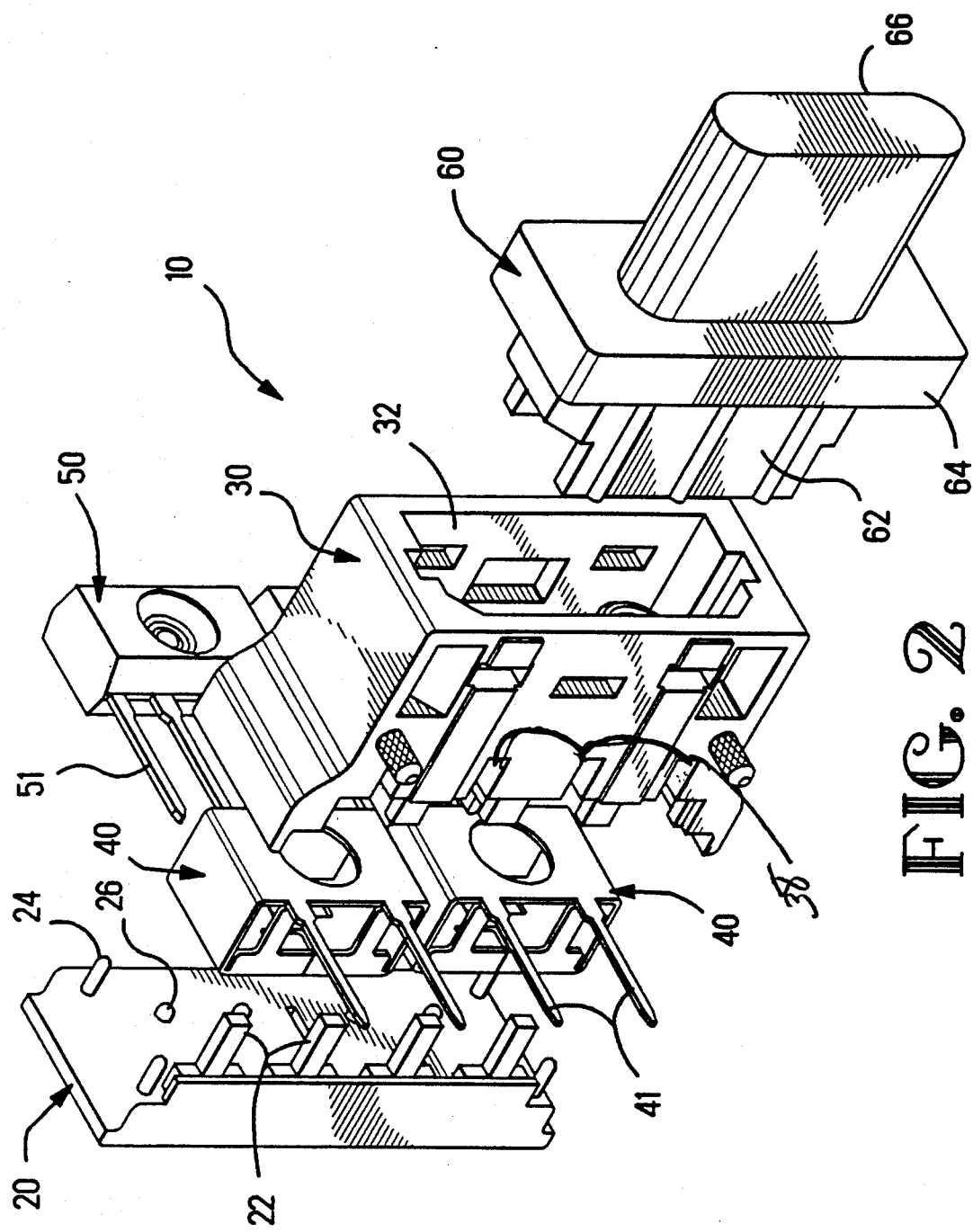
FIG. 2 is an exploded perspective drawing showing the manner of assembly of the discrete parts of FIG. 1.

FIG. 1 shows a fully assembled embodiment of the fiber optic receptacle assembly 10 according to the present invention, and FIG. 2 is an exploded perspective drawing showing the manner of assembly of the several parts.

The parts include a receptacle housing which is formed from discrete interlocking sections 20 and 30. The receptacle assembly 10 further includes one or more conductive shields 40 each of which is provided with a number of downwardly extending conductive terminals 41. The shields (a.k.a. "cans") 40 are stamped from metal and are configured to form an open ended enclosure for reducing electromagnetic interference. Shields 40 have downwardly protruding conductive terminals 41 which may be soldered to corresponding tracks on a printed circuit board. The upper portion of each conductive shield 40 is formed as an enclosure for receiving a corresponding active optical device 50. Tabs are provided at the bottom end of the enclosure to limit insertion of active optical devices 50 therein.

Optical devices 50 may be conventional photodiodes, photo-transistors, or photo-sensitive integrated circuits. For instance, the device 50 shown in FIG. 2 is a photographic integrated circuit having a plurality of downwardly extending terminals 51.

Interlocking sections 20 and 30 come together to form a fitted chamber in which the shields 40 and optical devices 50 may be seated.

Figure 3:
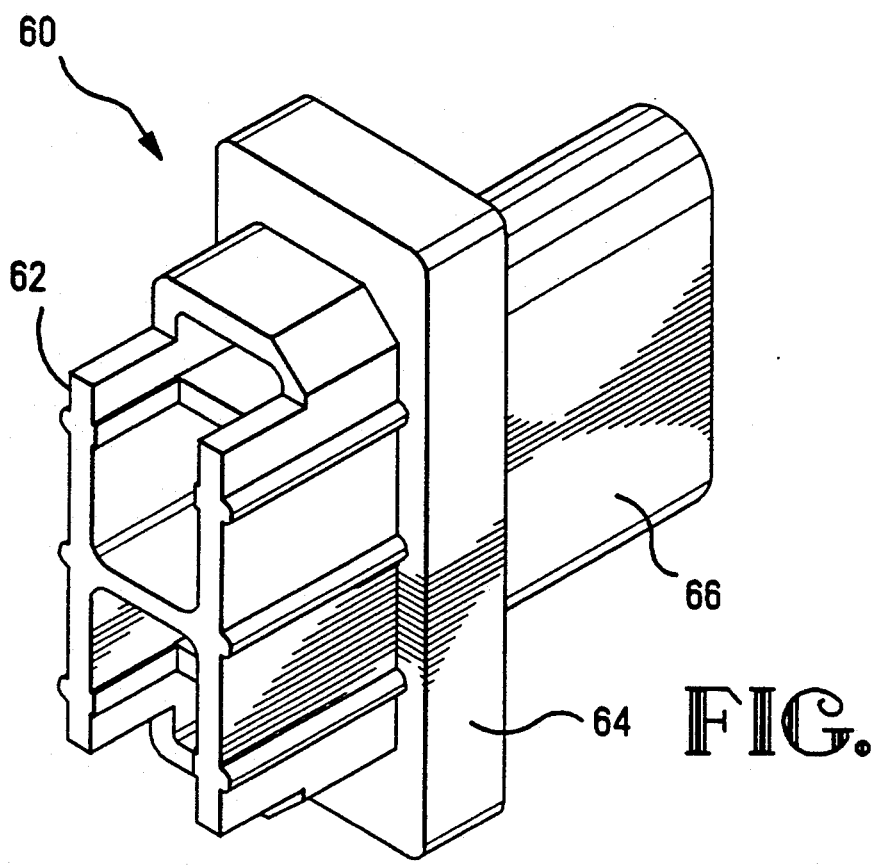
FIG. 3 is a perspective view of a standard receptacle cover as may be used in conjunction with the receptacle of the present invention.

An optional dust cover 60 may also be provided with the assembly. Dust cover 60, as more clearly shown in FIG. 3, includes a shroud 62 for insertion within the open end of the main section 30 of the receptacle housing. Shroud 62 conforms to the opening in section 30 and provides a resistance fit therein. Receptacle cover 60 also includes a stopper 64 (or flange) encircling the shroud for limiting insertion within the receptacle section 30. Stopper 64 also seals the open end of the receptacle assembly 10 when the receptacle cover 60 is fully inserted. Receptacle cover 60 also includes an outwardly extending tab 66 to facilitate handling of the receptacle assembly 10.

Figure 4:
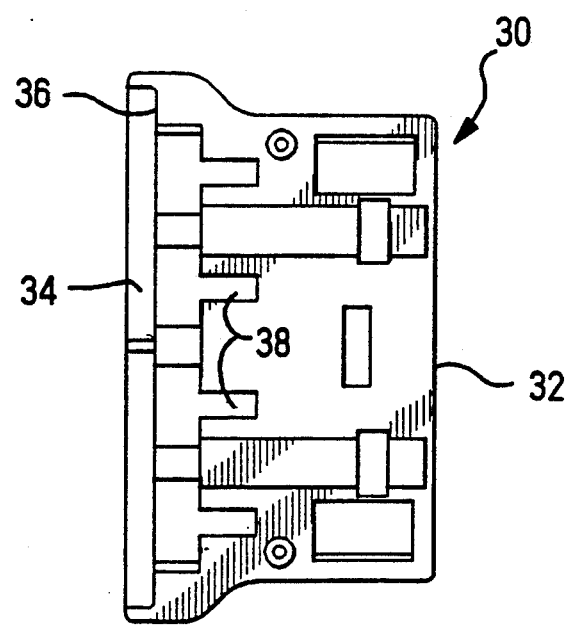
FIG. 4 is a bottom view of the main receptacle section 30 of FIGS. 1 and 2.
Figure 5:
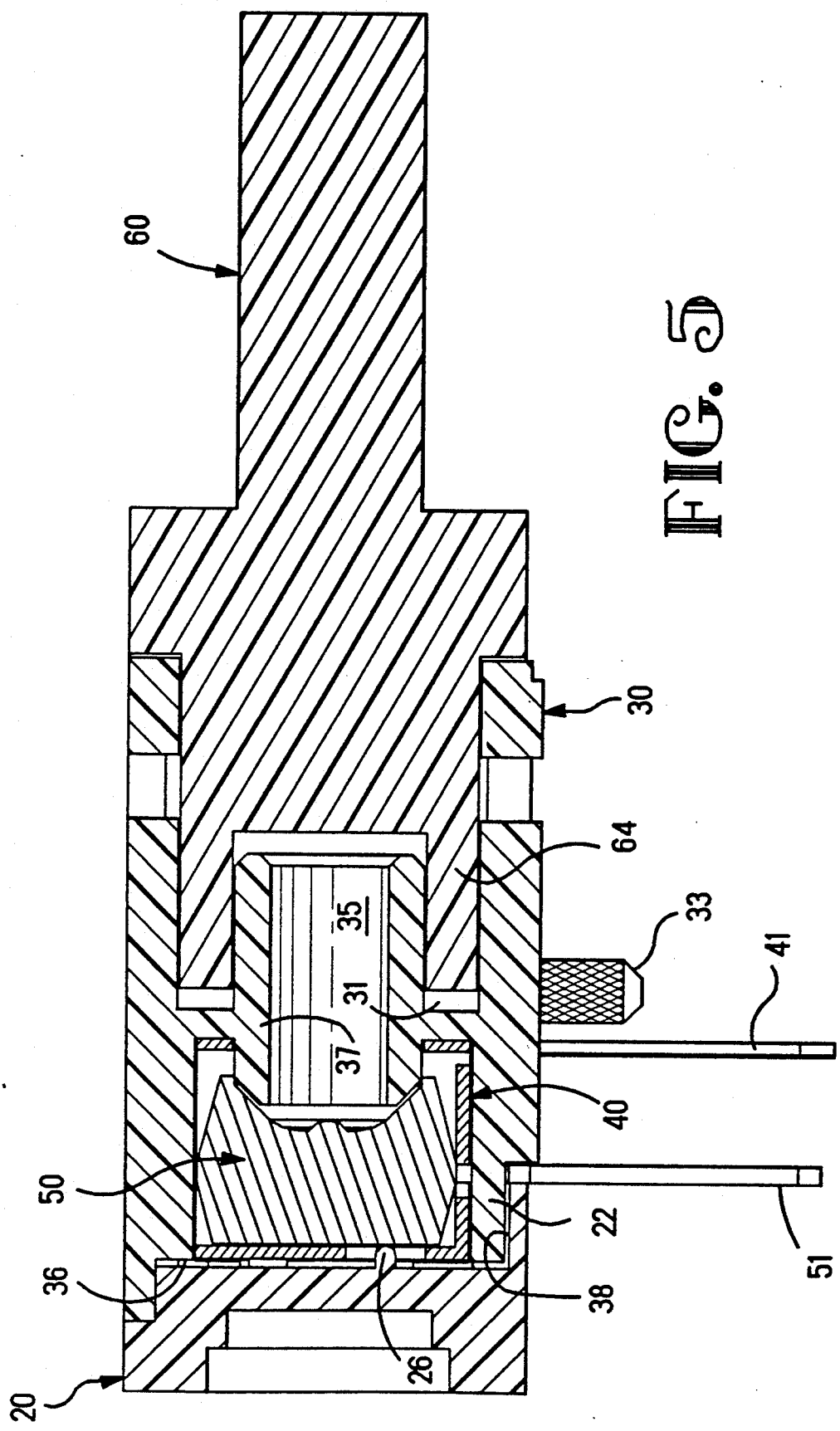
FIG. 5 is a cross-section of the main receptacle section 30 of FIGS. 1-2.
Figure 6:
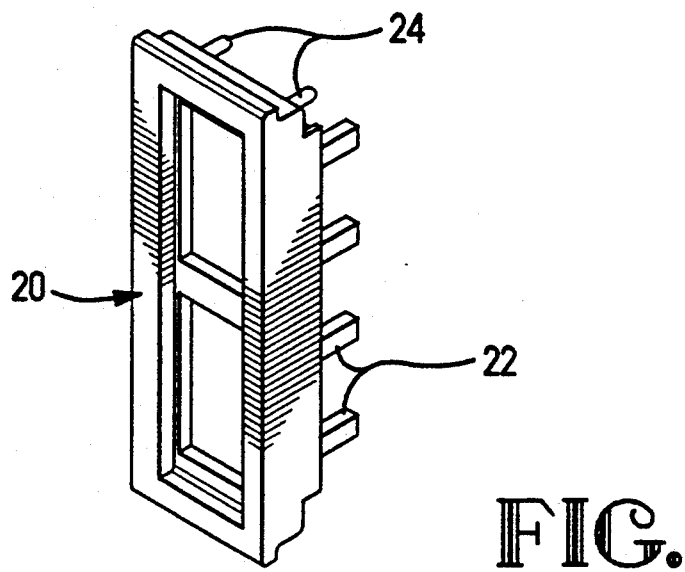
FIG. 6 is a perspective view of the end panel section 20 of FIGS. 1 and 2.
Figure 9:
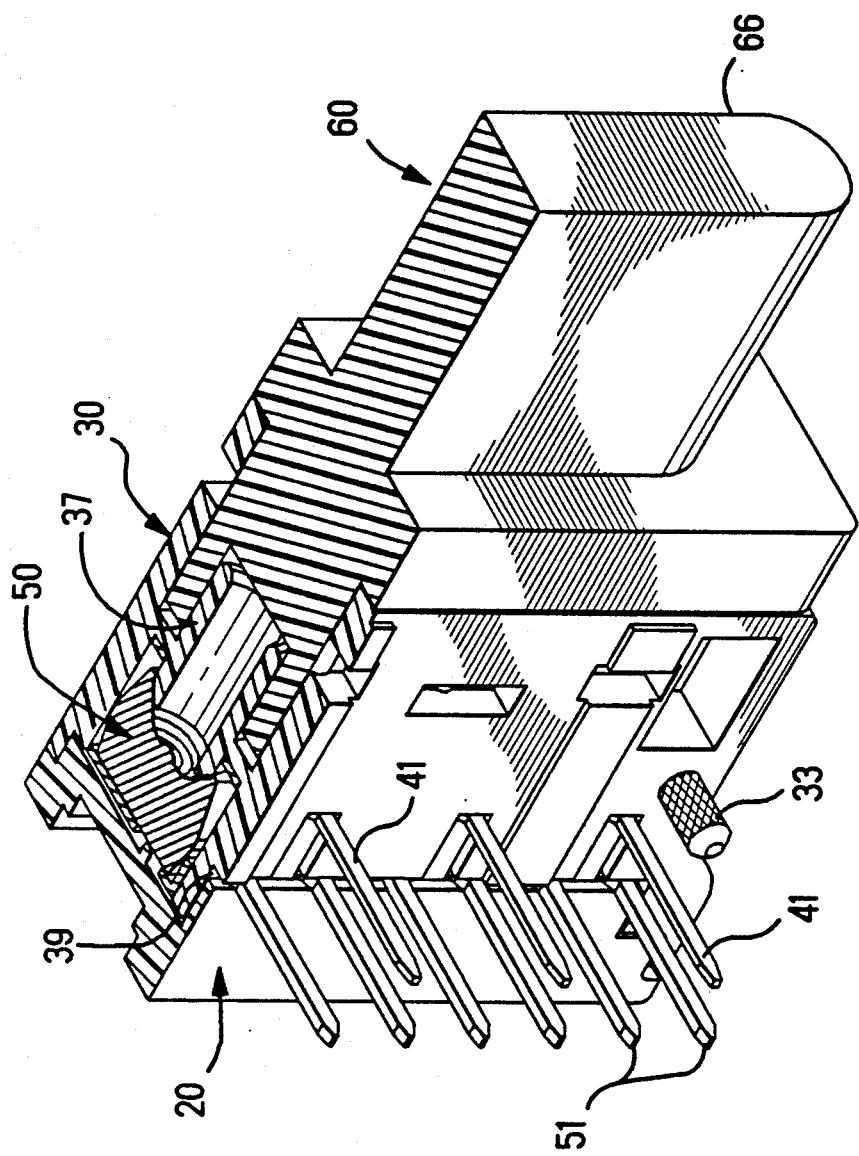
FIG. 9 illustrates a cut-away perspective view of the fully assembled duplex embodiment of FIG. 1.

As shown in FIGS. 4 and 5, the main section 30 of the receptacle housing generally comprises a walled structure which defines a central chamber 31. Main section 30 is open at a first end 32 to receive a receptacle cover 60 or, alternatively, a mating fiber optic plug (not shown) and the second or opposed end for receiving optical devices 50. The illustrated duplex embodiment of main section 30 is flared at end 34 to accommodate two side-by-side active optical devices 50 with accompanying shields 40. Active optical devices 50 are slidably inserted into the shields 40 with terminals 51 of optical devices 50 extending parallely downward alongside terminals 41 of shields 40. The main section 30 of the receptacle housing is also configured with a stepped outer lip 36 encircling the central chamber 31. Outer lip 36 cooperates with a complementary surface on cover 20 to prevent light from entering the cavity, as illustrated in FIG. 6. Shields 40 and active optical devices 50 may be inserted into the open end 34 of main section 30 until they become seated against respective stop surfaces within the housing. A plurality of channels 38 extend along the bottom of main section 30 from the open end 34 to the desired stop surface. These channels 38 accommodate conductive terminals 41 extending downwardly from the respective shields 40, as seen in FIG. 9. Channels 38 open into a perpendicular slot 39 that is defined when the two sections 20, 30 of the housing are assembled. Slot 39 accommodates the conductive terminals 51 of active optical devices 50 in the completed assembly 10.

As shown in FIG. 5, the main section 30 may be provided with an integrally molded alignment and ferrule-receiving member(s) 37 supported within the central chamber of the receptacle housing. Ferrule-receiving members 37 include a bore or channel 35 to provide an optical communication path between the active optical devices 50 and the open end 32 of housing main section 30. In addition, ferrule-receiving members 37 cooperate with a commercially available type of optical device 50 which is formed with a concave face to facilitate alignment. The ferrule-receiving members 37 of the main housing section 30 make use of the concave face to perform a self-alignment feature as will be described. Ferrule-receiving members 37 are provided with frustoconical tips which are designed to cooperate with a concave face of optical devices 50 to facilitate self-alignment.

Figure 7:
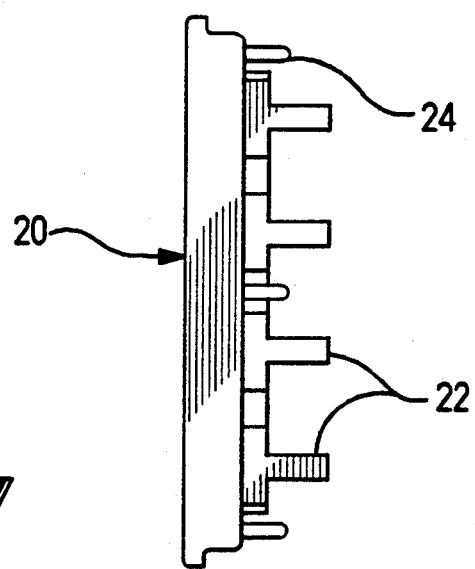
FIG. 7 is a bottom view of the end panel section 20 of FIG. 6.
Figure 8:
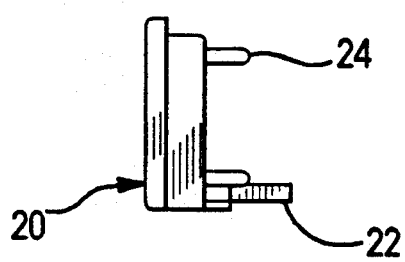
FIG. 8 is a side view of the end panel section 20 of FIGS. 6 and 7.

As shown in FIGS. 6-8, receptacle section 20 generally comprises a rectangular end panel having a series of integrally molded resilient first pegs 22 extending therefrom. Pegs 22 are arranged to fit within the channels 38 of main section 30 of the receptacle housing. Pegs 22 are dimensioned to provide a secure resistance fit in and along each of channels 38. The depth to which the pegs 22 can be inserted into the respective channels is adjustable to accommodate the range of tolerances for the devices 50 and shields 40. Thus, when sections 20 and 30 are joined, tabs 22 of cover section 20 are inserted to the depth necessary to securely lock shields 40 and active optical devices 50 within the two receptacle sections 20 and 30 and the stepped lip configuration 36 prevents light from entering the receptacle housing. Section 20 of the receptacle housing may also be provided with additional second pins 24 to increase the stability of the resistance fit and to properly align section 20 during insertion in main section 30. As can be seen in FIGS. 2 and 5, the inner surface of cover 20 preferably includes a plurality of third pins or dimples 26 that are configured to extend through cooperation apertures in the shield and press against the rear surface of the optical devices 50, thereby ensuring that the devices are held in alignment against the frusto-conical tips of ferrule-receiving members 37.

To assemble the receptacle 10, shields 40 with active optical devices 50 are fully inserted within main section 30 of the receptacle housing until they are seated against cooperating stop surfaces therein. End panel or cover section 20 of the receptacle housing is then inserted within main section 30 to fully enclose shields 40 and active optical devices 50. During insertion, pegs 22 urge the shields 40 and optical devices 50 fully backward against the respective stop surfaces of main section 30.

Pegs 22 enter channels 38 of main section 30 and become anchored therein to provide a secure resistance fit. Pegs 26 push against the optical devices 50 to assure the devices are aligned against the associated ferrule-receiving member.

FIG. 9 is a perspective cut-away view showing the fully assembled receptacle assembly. After optical devices 50 have been inserted within shields 40, which in turn have been inserted into the back end 34 of housing main section 30, attachment of cover plate section 20 automatically aligns optical devices 50. Specifically, as housing section 20 is inserted into housing main section 30 with pegs 22 being received in slots 38, housing section 20 biases optical devices 50 against the internal ferrule-receiving member within housing main section 30. As insertion continues, the frusto-conical tips of ferrule-receiving member bear against the concave face of optical devices 50 and serve to center the optical devices 50. When housing section 20 is fully inserted within housing main section 30 such that optical devices 50 are sealed within, the optical devices 50 are held in exact alignment with ferrule-receiving member by the pegs 26 and are tightly anchored within the central chamber of housing main section 30. The compressive fit of the frusto-conical tip of interior ferrule 37 against the concave face of active optical devices 50 secures the aligned optical devices 50 and sustains the alignment despite the frequently punishing assembly process. This way, when receptacle cover 60 is eventually removed and replaced by a conventional fiber optic plug, the optical fibers terminating in the plug will be perfectly aligned with the active optical devices 50 within the receptacle assembly 10 of the present invention.

Alternatively, the alignment features of the ferrule-receiving members 37 may be eliminated and a receptacle cover having extending alignment pylon(s) as shown and described in co-pending application Ser. No. 905,937 may be used to achieve the same purpose.

With either a conventional cover 60 or an alignment-type receptacle cover, the completed receptacle assembly 10 may be easily attached to a circuit board (not shown) and anchored thereto by pylons 33 that extend from the bottom of main housing 30, as shown in FIG. 9. Terminals 41 and 51 may conveniently be soldered to the respective tracks of the printed circuit board. The secure resistance fit provided by the interlocking pegs 22 of cover panel section 20 within the channel 38 of main housing section 30 maintains the integrity of the completed receptacle assembly 10 throughout the assembly process, and exact alignment is maintained.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. An optical receptacle assembly, comprising:
   a receptacle housing, said housing further including,
   a main housing section having a first open end for receiving an optical plug or, alternatively, a receptacle cover, and a second open end for receiving an active optical device;
   an end panel section slidably insertable into said main housing section to cover said second open end, and to thereby enclose and secure the active optical device received therebetween against said main housing section.

2. The optical receptacle assembly according to claim 1, wherein said end panel section is provided with a plurality of protruding pegs, and the main housing section is provided with a corresponding plurality of channels for receiving said pegs, said pegs invading said channels in a secure resistance fit when said end panel section is slidably inserted into said main housing section and thereby fastening said end panel section thereto.

3. The optical receptacle assembly according to claim 2, wherein said end panel section is provided with a second pin that is receivable within said main housing section for stabilizing and aligning the end panel section during insertion into the main housing section.

4. The optical receptacle assembly according to claim 2, further comprising a receptacle cover for covering said second open end of said main housing.

5. The optical receptacle assembly according to claim 2, wherein said end panel section may be slidably inserted into said main housing section to enclose said active optical device therebetween, said active optical device being compressed against said main housing section and held in place by said resistance fit.

6. The optical receptacle assembly according to claim 2, further comprising a conductive shield formed as an enclosure in which said active optical device may be slidably inserted.

7. The optical receptacle assembly according to claim 6, wherein said end panel section may be slidably inserted into said main housing section to enclose said shield and active optical device therebetween, said shield and active optical device being compressed against aid main housing section and held in place by said resistance fit.

8. A duplex optical receptacle assembly, comprising:
   a duplex receptacle housing, said housing further including,
   a main housing section having a first open end for receiving a duplex optical plug or, alternatively, a receptacle cover, and a second open end for receiving two side-by-side active optical devices;
   an end panel section insertable into said main housing section to cover said second open end, and to thereby enclose and secure the active optical device received therebetween against said main housing section.

9. The optical receptacle assembly according to claim 8, wherein said panel section is provided with a plurality of protruding pegs, and the main housing section is provided with a corresponding plurality of channels for receiving said pegs, whereby said pegs invade said channels when said end panel section is slidably inserted into said main housing section to fasten said end panel thereto by a secure resistance fit.

10. The optical receptacle assembly according to claim 9, wherein said end panel section is provided with a second pin receivable within said main housing section for stabilizing and aligning the end panel section during insertion into the main housing section.

11. The optical receptacle assembly according to claim 9, further comprising a receptacle cover for covering said second open end of said main housing.

12. The optical receptacle assembly according to claim 9, wherein said end panel section may be slidably inserted into said main housing section to enclose said active optical devices therebetween, said active optical device being compressed against said main housing section and held in place by said resistance fit.

13. The optical receptacle assembly according to claim 9, further comprising a pair of conductive shields each formed as an enclosure for one of said active optical devices, said optical device being slidably insertable therein.

14. The optical receptacle assembly according to claim 13, wherein said end panel section may be slidably inserted into said main housing section to enclose said shields and active optical devices therebetween, said shields and active optical devices being compressed against said main housing section and held in place by said resistance fit.

15. An optical receptacle assembly, comprising:
   a receptacle housing for seating an active optical device of a type having a concave alignment face, said housing further including,
   a main housing section defining a central chamber, a first open end for receiving an optical plug or, alternatively, a receptacle cover, and a second open end for receiving said active optical device, said main housing section further including a ferrule formed integrally therein to provide an optical communication path to the concave face of said active optical device, said ferrule having a rimmed tip extending toward said second open end of said main housing section,
   an end panel section slidably insertable into said main housing section to cover said second open end thereby enclosing said active optical device, said end panel section urging said concave face of said active optical device against said rimmed tip of said ferrule, and said ferrule serving to bias said active optical device into alignment when said end panel section is fully inserted in said main housing section.

16. The optical receptacle assembly according to claim 15, wherein one of said panel sections is provided with a plurality of protruding pegs, and the other of said panel sections is provided with a corresponding plurality of notches for receiving said pegs, whereby said pegs invade said notches when said end panel section is slidably inserted into said main housing section thereby fastening said end panel thereto by a secure resistance fit.

17. The optical receptacle assembly according to claim 16, further comprising a receptacle cover for covering said second open end of said main housing.

18. The optical receptacle assembly according to claim 16, wherein said end panel section may be slidably inserted into said main housing section to enclose said active optical device therebetween, said concave face of said active optical device being compressed against the rimmed of said ferrule in the main housing section and aligned thereon, and the alignment being maintained by said resistance fit.

19. The optical receptacle assembly according to claim 16, further comprising a conductive shield formed as an enclosure in which said active optical device may be slidably inserted, said shield being defined by an opening to expose said concave face of said active optical device when said device is inserted.

20. The optical receptacle assembly according to claim 16, wherein said end panel section may be slidably inserted into said main housing section to enclose said shield and active optical device therebetween, said exposed concave face of said active optical device being compressed against the rimmed tip of said ferrule in the main housing section to align said active optical device and to maintain said alignment by resistance fit.

* * * * *